(No Model.)
S. RITTER.
PHOTOGRAPHIC CAMERA.
No. 589,304. Patented Aug. 31, 1897.
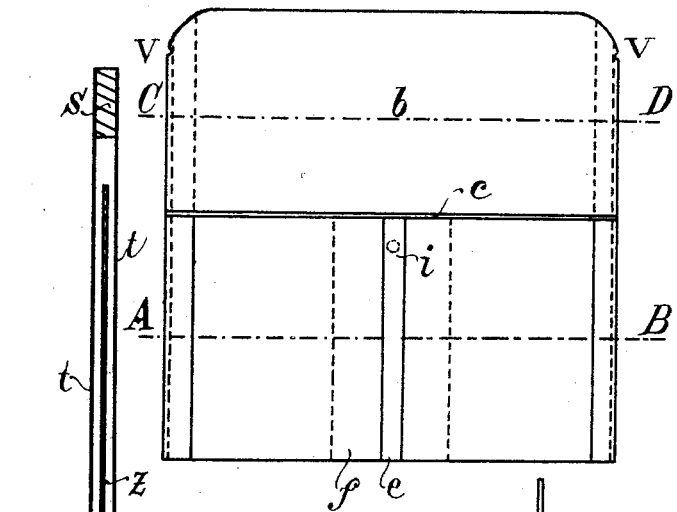
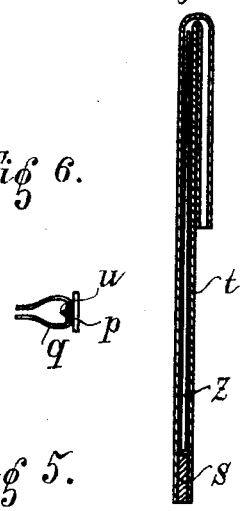
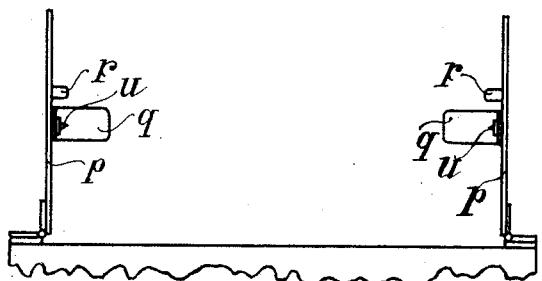
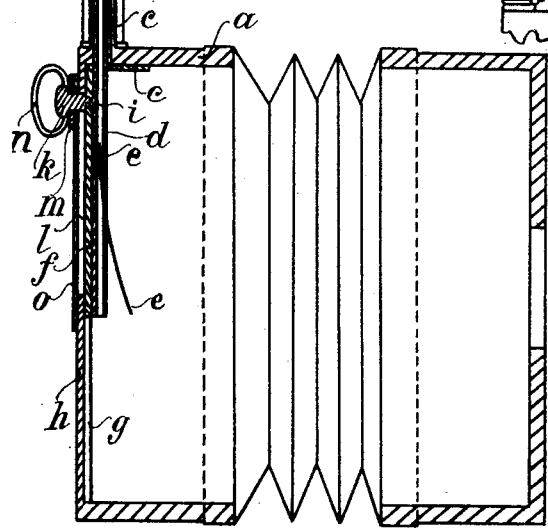
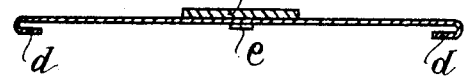
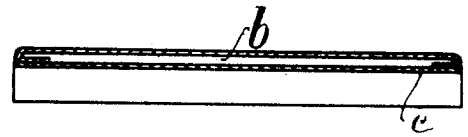
Witnesses:
Inventor:
Sophus Ritter
By
his Attorneys.

UNITED STATES PATENT OFFICE.

SOPHUS RITTER, OF COPENHAGEN, DENMARK.

PHOTOGRAPHIC CAMERA.

SPECIFICATION forming part of Letters Patent No. 589,304, dated August 31, 1897.

Application filed May 4, 1897. Serial No. 635,019. (No model.)

*To all whom it may concern:*

Be it known that I, SOPHUS RITTER, a resident of Copenhagen, Denmark, have invented certain new and useful Improvements in Photographic Cameras; and I do declare that the following is a full, clear, and exact description of the invention, which will enable others skilled in the art to which it appertains to use the same.

The object of the present invention is a photographic camera that is constructed in such a manner that the prepared plate may be conveyed direct from its wrapper or packing into the camera and, after exposure, from the camera back again into the packing without necessitating a dark chamber and without the plate being for a single moment exposed to the light.

With this object in view a funnel arranged in firm connection with the upper side of the camera has hitherto been used. As, however, such a funnel projects above the camera it is constantly exposed to being squeezed or damaged in some other manner. As, furthermore, the opening of the funnel after the bag or packing containing the plate having been removed is left unprotected dirt and dust can enter freely into the interior of the camera. The projecting funnel also makes it very difficult to fix the bag containing the plate to the mouth of the funnel in such a manner that the plate may slide easily down into the camera without it being liable to stick fast on the way. In order to do away with these drawbacks, the funnel for conveying the plate to and from the camera is made movable and arranged in such a manner that it may be pushed completely into the camera when it is not being used. While on new cameras the funnel is made movable in a slot on one of the sides of the camera, the new arrangement may easily be applied to existing cameras by making the funnel movable in a loose case or frame that may be slipped into the camera in the ordinary way.

The camera forming the object of the present invention is furthermore provided with certain arrangements that serve partly to attach the bag containing the plate to the mouth of the funnel and partly to give during the sliding down into the camera such a direction to the plate that it cannot possibly stick fast on the way.

In the accompanying drawings the invention is shown as follows:

Figure 1 is a vertical and longitudinal section through a camera provided with the new arrangements. Fig. 2 is a front view of the funnel. Figs. 3 and 4 show, respectively, sections through Fig. 2 according to the lines A B and C D. Fig. 5 shows the arrangements by means of which the bag containing the plate is attached to the mouth of the funnel, and the plate is placed in the right position before the sliding down, partly in section. Fig. 6 is a top view of Fig. 5, and Fig. 7 is a section through the bag containing the plate.

The camera, Fig. 1, may be of any shape whatever. One of its sides—for instance, the upper side $a$, as shown in the drawings—is toward the back provided with a slot through which the funnel $b$ can move up or down. The shape of the funnel $b$, Figs. 1 and 2, is arranged so as to afford ample space for the insertion of the plates, and it may suitably be made of thin metal plates. On the front side of the funnel is arranged an angle-plate $c$, whose horizontal flange lies against the under surface of the side of the camera when the funnel is in its uppermost position, whereby the camera gets perfectly closed against admission of light on that plate.

Underneath the horizontal flange of the angle-plate $c$ the front side of the funnel $b$ is cut away (see Fig. 3) in order that the plate, when inserted, may be exposed to the light coming through the objective. The inserted plate is kept in its place by means of the bent edges $d$ and pressed up against the front of the funnel by a spring $e$.

The back of the funnel is provided with a somewhat thicker plate $f$, which during the movement up and down of the funnel slides in a corresponding groove $g$ in the camera-wall $h$, and thus helps to guide the movement of the funnel and limit same.

In the plate $f$ is arranged a hole $i$, into which is screwed a set-screw $k$. During the movement up and down of the funnel this set-screw slides in a vertical slot $l$ in the camera-wall $h$ and is provided with a washer $m$ outside the camera and a suitable handle $n$. By screwing the set-screw into the plate $f$ the washer is pressed against the camera-wall, whereby the funnel is kept in position.

The slot $l$ is covered by a plate $o$ with an opening for the set-screw, the plate moving up and down the screw. In order to keep out the light, all surfaces along which the funnel is sliding and through which the light might pass are provided with strips of cloth or other suitable substance.

At each end of the slot through which the funnel moves up and down is arranged a hinge-piece $p$. By means of these two hinge-pieces the slot-opening can be completely closed when the camera is not in use and the funnel is let down into the camera. On the inner side of these hinge-pieces are fixed spring-clips $q$, Figs. 1, 5, and 6, that grip around the edges of the bag containing the plate when the bag is slipped onto the mouth of the funnel for the purpose of conveying the plate to or from the camera. Between the arms of the spring-clips are fixed pins $u$, that penetrate into the side of the bag and fit into small holes $v$ on the sides of the funnel $b$ when this is pushed out. By means of this arrangement the fastening of the bag to the funnel is made secure, especially when the bag is hanging down one side.

In Fig. 5 one arm of the spring-clip has been removed to show the pin $u$. The hinge-pieces are further provided with small projecting pieces $r$, rounded off on the top, for the purpose of guiding the direction of the plate in its downward motion, which can be done by simply pressing the hinge-piece slightly against the edges of the plate through the bag.

The photographic plates are each inclosed in a kind of bag $t$, Fig. 7, that is made of paper or other suitable material, through which light cannot pass. The bottom of the bag is provided with a piece of cardboard $s$ of the same thickness of the photographic plate, and the length of the bag is made somewhat greater than the length of the plate.

When a photographic operation is to be effected, the upper end of the bag is slipped over the mouth of the funnel and is kept in position by the spring-clips $q$ on the hinge-pieces $p$. When now the bag is placed bottom upward above the funnel, the plate is brought to slide down through same, if necessary, by pressing onto the guide-pieces $r$. After exposure the whole camera is turned round and the plate will again slide through the funnel into the bag, that can be removed. The whole operation has thus been effected without the plate having been unduly exposed to the influence of light.

Having now particularly described and ascertained the nature of this said invention and in what manner the same is to be performed, I declare that what I claim is—

1. The combination in a camera, the box or case, and a funnel carried thereby, said funnel being permanently and movably connected with the box or case, to be projected therefrom or to be moved into the case, substantially as described.

2. The combination, with a box or case having the slotted back, the funnel moving in the casing and the handle projecting outside the casing for moving the funnel, substantially as described.

3. The combination in a camera with the box or case, a funnel arranged to be moved into and out of the same, and the hinge-pieces arranged at the ends of the slot through which the funnel can be moved, said hinge-pieces having spring-clips $q$, pins $u$ and guide-pieces $r$, substantially as described.

In witness whereof I have hereunto set my hand in presence of two witnesses.

SOPHUS RITTER.

Witnesses:
ERNEST BOUTARD,
JULES BLOM.